June 13, 1961  L. N. DONALDSON  2,987,812
METHOD OF ASSEMBLING CLOSURE TIPS ON PLASTIC DISPENSING SPOUTS
Filed June 18, 1957  8 Sheets-Sheet 3
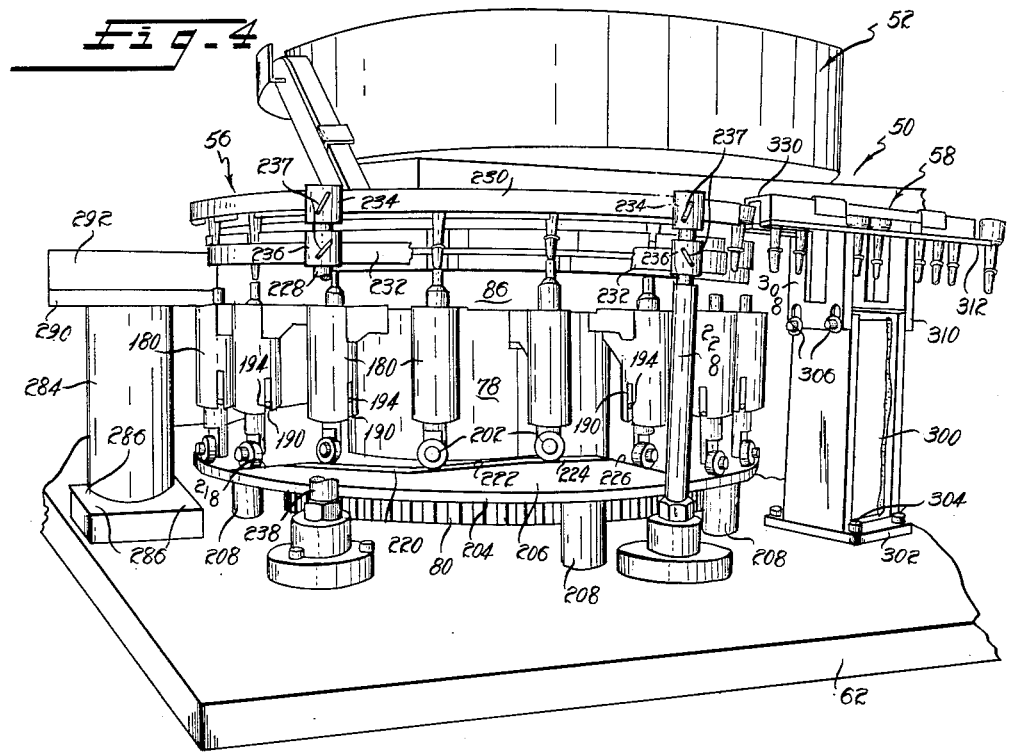
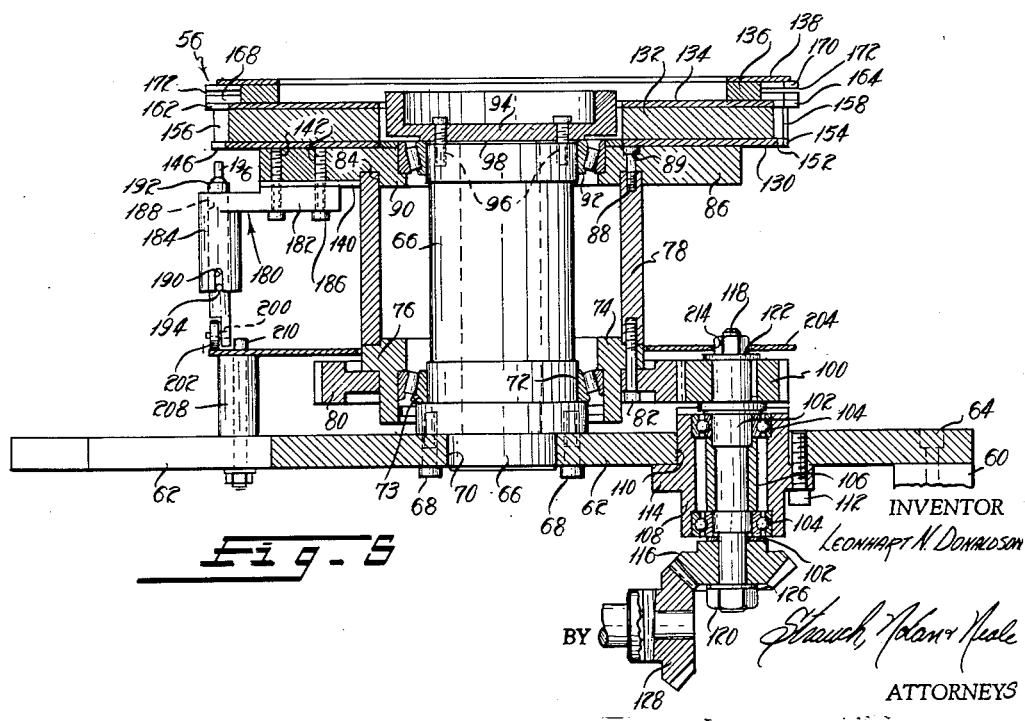
INVENTOR
LEONHART N. DONALDSON
BY
ATTORNEYS INVENTOR
LEONHART N. DONALDSON
BY
Strauch, Nolan + Neale
ATTORNEYS

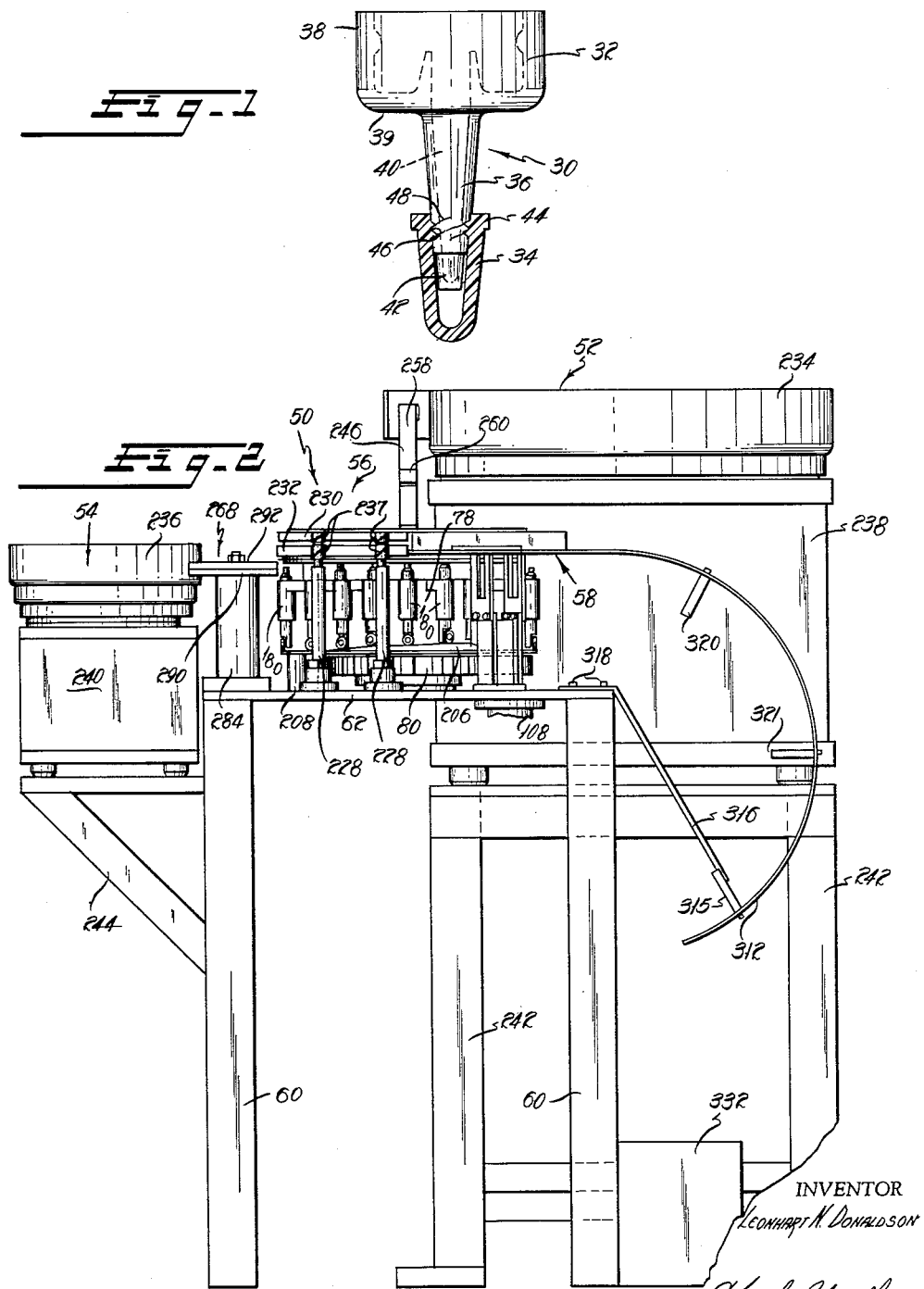

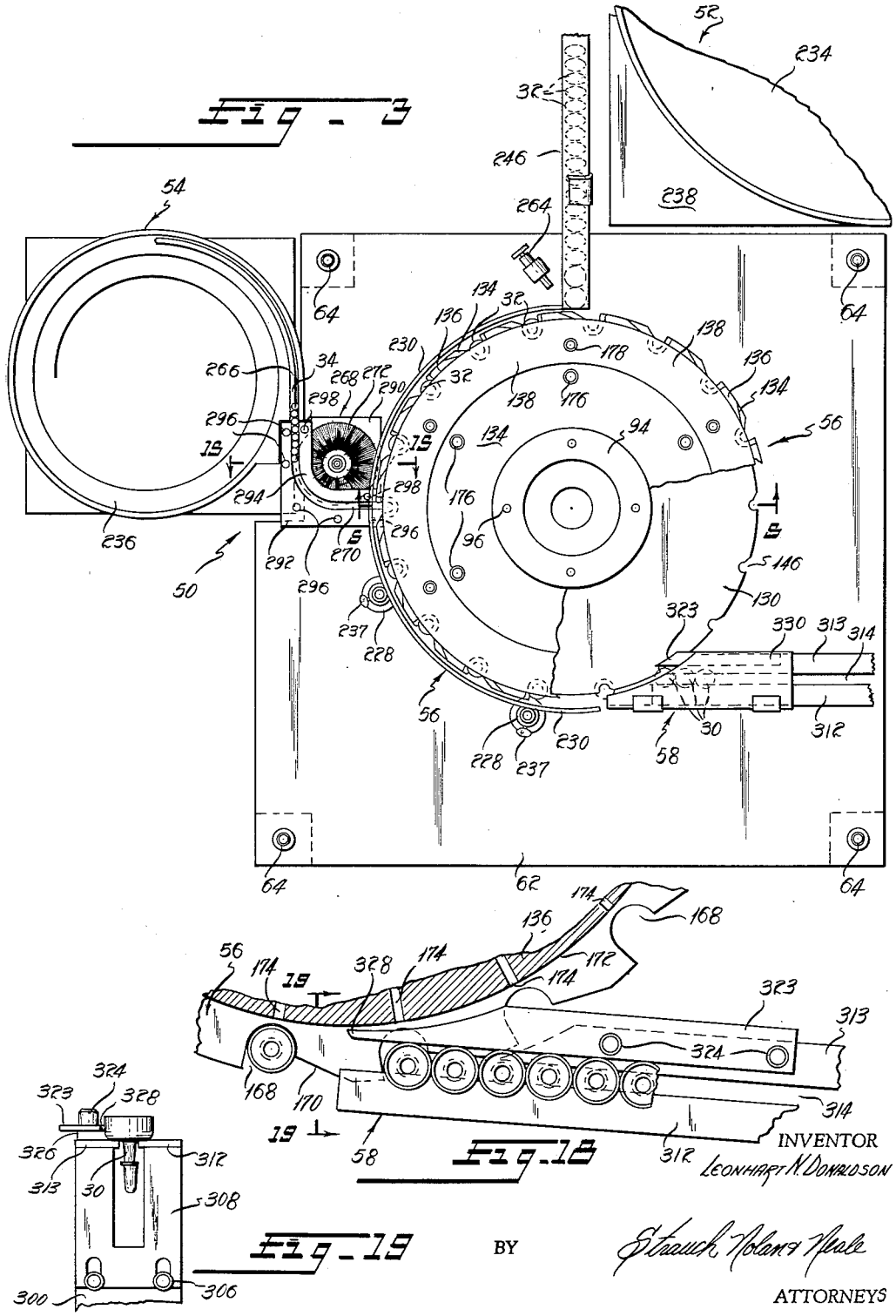

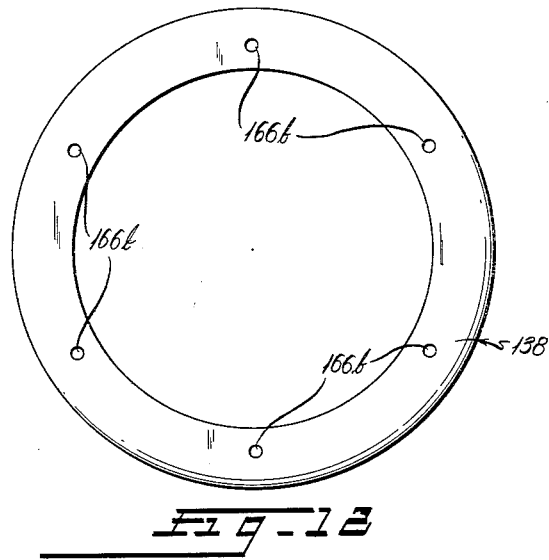
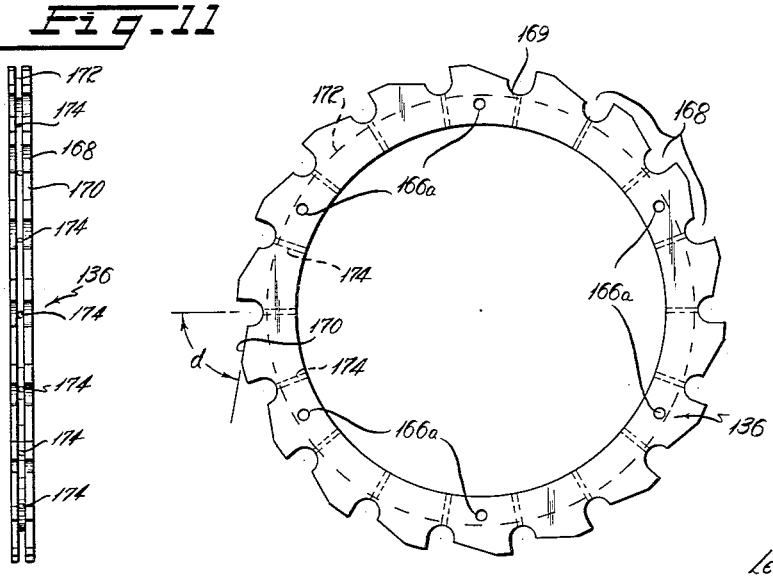

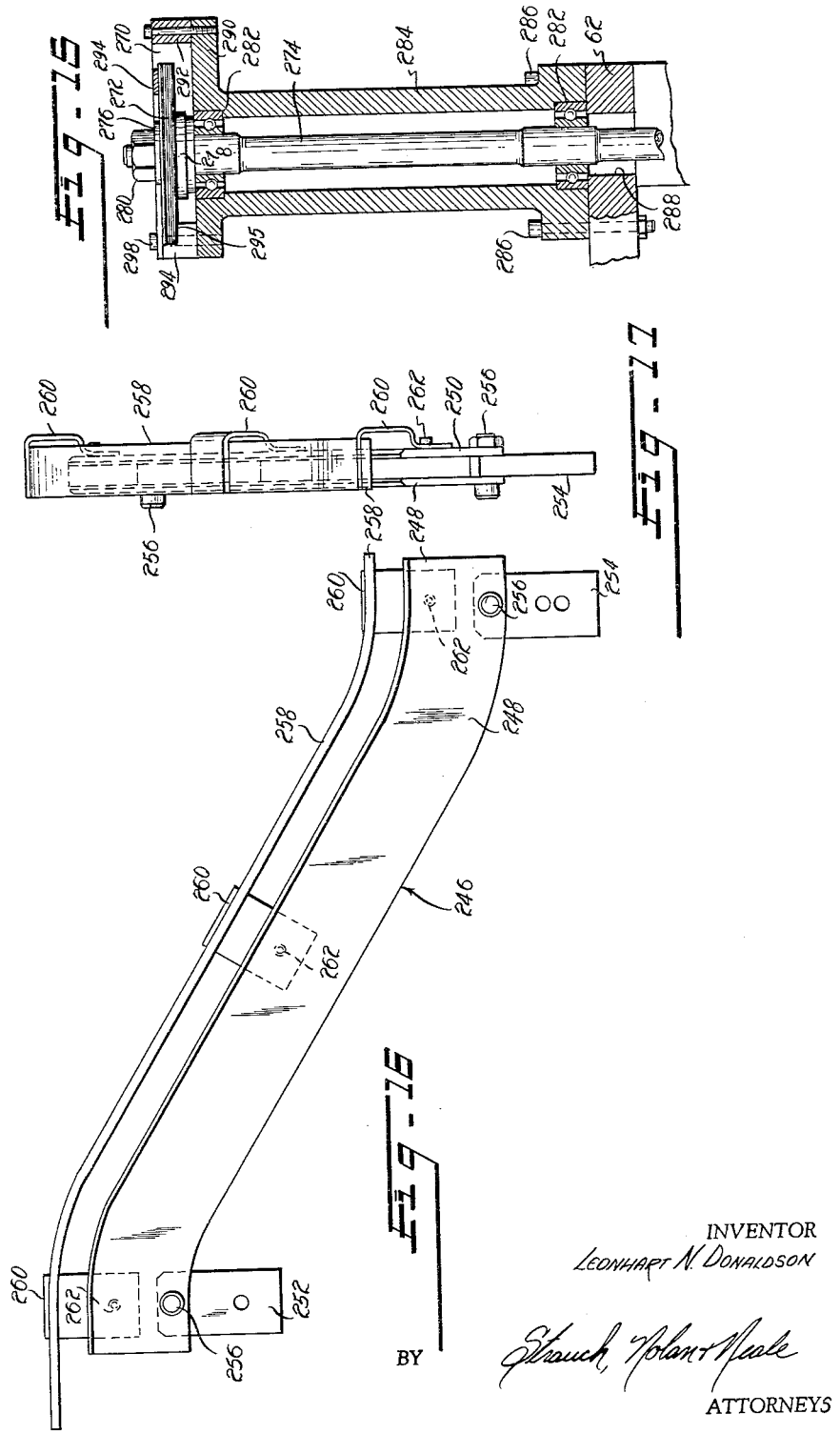

United States Patent Office 2,987,812
Patented June 13, 1961

2,987,812
METHOD OF ASSEMBLING CLOSURE TIPS ON PLASTIC DISPENSING SPOUTS
Leonhart N. Donaldson, Warren, Pa., assignor to West Penn Closure Corporation, Warren, Pa., a corporation of Delaware
Filed June 18, 1957, Ser. No. 666,440
2 Claims. (Cl. 29—453)

The present invention relates to an assembly method, and more particularly to a method for automatically assembling closure tips on dispensing spouts for fluid containers.

Volatile fluids, like lighter and cleaner fluid, are widely marketed in so-called beaded neck containers, which are capped by plastic dispensing spouts like that disclosed in United States Letters Patent No. 2,670,885 to Chester S. Allen, dated March 2, 1954, and in FIGURE 1 of the accompanying drawings. This type dispensing spout has a closure tip which is removable for dispensing of fluid and replaceable to close off the spout and container when fluid is not being dispensed to prevent inadvertent loss of the fluid.

It has been found that the closure tip is most satisfactory when provided with means for positively retaining it on the dispensing spout, and for this purpose, the closure tip is generally provided with a thread whereby it is screwed on the pouring tip of the spout. The pouring tip of the spout is sometimes also formed with a thread for cooperation with the screw thread of the closure tip. However, the closure tip can be made of a harder material than the dispensing spout with a self-cutting screw thread inside so that the closure tip will cut a cooperating retaining thread on the softer plastic tip of the pouring spout when the former is assembled on the latter.

Initially, both types of closure tips were assembled on the plastic dispensing spouts by screwing them on by hand. This, of course, is a relatively costly operation, especially considering that the lighter fluid packaging industry is characterized by large volume, small unit value, and small profit margin. To eliminate manual assembly, the Sylvania Electric Products, Inc., has heretofore developed a machine for assembling closure tips on spouts. However, prior to my invention, it was thought necessary to screw the closure tip on the spout (including the self-threading type), and the Sylvania machine therefore comprises a complicated mechanism for screwing the closure tip on the pouring tip of the spout. This machine, which has been used to assemble closure tips and spouts like that shown in FIGURE 1 for applicant's assignee, is prone to malfunction and requires substantial maintenance. It does not assemble tips and spouts too economically, and, in areas of low labor costs, hand assembly is commercially competitive with this prior assembly machine.

The present invention provides a novel improved method for completely assembling threaded closure tips on plastic dispensing spouts without resorting to screwing them on, thereby accomplishing faster, more efficient and more economical assembly than was possible with prior hand or automatic assembly.

It is accordingly a principal object of the present invention to provide a novel improved method for completely assembling closure tips on container pouring spouts, and more especially for assembling threaded closure tips on threaded or unthreaded plastic dispensing spouts without screwing the closure tip on the spout.

It is another object of the present invention to provide an improved method for assembling threaded closure tips on container dispensing spouts at a cost of one-half to two-thirds and even less than prior hand or automatic assembly means heretofore available.

The above-stated and other objects and advantages of the present invention will be apparent from the following description and claims appended thereto, with reference to the accompanying drawings, wherein:

FIGURE 1 is an inverted elevation view of a plastic dispensing spout and closure tip assmbled thereon by the method and apparatus of the present invention, the closure tip (shown in cross section) being a self-threading type;

FIGURE 2 is a side elevation view of the automatic assembly apparatus according to the present invention (driving motor and related gearing being omitted for clarity since the details thereof do not form a part of the invention herein claimed);

FIGURE 3 is a top plan view of the assembly machine shown in FIGURE 2, with parts of the device broken away;

FIGURE 4 is an enlarged perspective view of the rotating spout and tip assembly turret in the machine shown in FIGURES 2 and 3;

FIGURE 5 is a cross-sectional view of the assembly turret in the machine shown in FIGURES 2-4, taken along line 5—5 in FIGURE 3;

Figure 13:
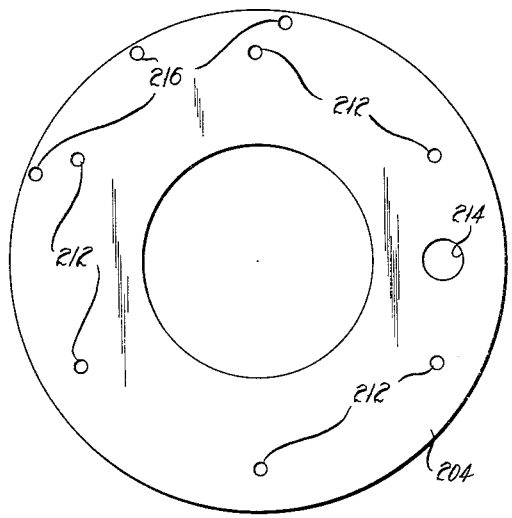
Figure 14:
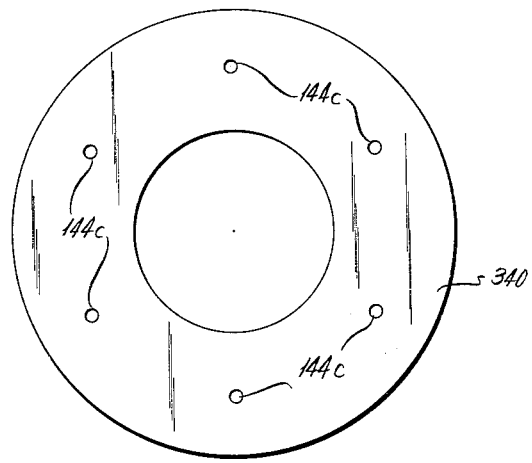

FIGURES 6-10 and 12, respectively, are plan views of various plates comprising the assembly turret shown in cross section in FIGURE 5;

FIGURE 11 is a side view of the spout housing plate shown in FIGURE 10;

FIGURE 13 is a plan view of a cam supporting plate which forms a part of the assembly turret shown in cross section in FIGURE 5;

FIGURE 14 is an optional spout spacer plate for use in the assembly turret shown in cross section in FIGURE 5 to modify the assembly machine of FIGURES 1-5 to assemble closure tips on spouts of different length;

FIGURE 15 is a cross-sectional view, along line 15—15 in FIGURE 3, showing part of the means for positively feeding closure tips into the assembly turret;

FIGURE 16 is a side view of the chute for feeding spouts to the rotating assembly turret;

FIGURE 17 is an end view of the spout chute shown in FIGURE 16;

FIGURE 18 is a detailed plan view of the removal means for withdrawing assembled spouts from the assembly turret, part of which is shown in fragmentary cross section; and FIGURE 19 is an end view of the spout removal means looking in the direction of lines 19—19 in FIGURE 18, but with the portion of the turret assembly shown in FIGURE 18 being omitted for clarity.

In FIGURE 1, there is shown at 30 a plastic dispensing spout 32 with closure tip 34 assembled on the pouring tip 36 of the spout. The spout 32 has an elongated skirt 38 adapted to seat in sealing engagement on the pouring neck of a beaded neck type container and has a fluid passage 40 extending through spout pouring tip 36. The end of tip 36 can be pinched or cut off at 42 so that liquid can be dispensed through the spout 32. (For a more complete disclosure, see the aforementioned Allen Patent No. 2,670,885.) Closure tip 34, which is provided for sealing off spout 32 and the contents of the container on which the spout is applied, has a configuration as shown in FIGURE 1. Adjacent its open end, the closure tip 34 is provided with a small peripheral outside flange or skirt 44, and on the inside with a thread 46. In a preferred embodiment, spout 32 is made of a relatively soft plastic like polyethylene, and closure tip 34 is made of a relatively hard thermosetting plastic. The thread 46 inside of tip 34 is a self-cutting type, so that it cuts a thread 48 on the spout tip 36 for retaining the closure tip 34 on the spout 32. However, it is within the scope of this invention for both tip 34 and spout 36 to be preformed with mating threads, as will hereinafter be amplified.

Referring particularly to FIGURES 2–5, there are shown various views of an assembly machine generally indicated at 50 for automatically assembling spouts 32 and closures 34 according to the present invention. Assembly machine 50 generally comprises hopper and feeder means generally indicated at 52 and 54 for orienting and feeding spouts 32 and tips 34, respectively, to an assembly turret 56 wherein the spouts and closure tips are assembled into a unit as shown in Figure 1, and thence discharged to a container through the discharge means generally indicated at 58.

Assembly machine 50 comprises a machine stand 60 supporting a machine bed plate 62 on which the turret assembly 56 is mounted, bed plate 62 being secured to stand 60 by suitable means such as machine bolts 64. Referring especially to FIGURE 5, a central column 66 for the turret assembly 56 is mounted on the machine bed plate 62 by a plurality of machine screws 68, with the lower end of the column extending through a circular aperture 70 in the bed plate 62. The inner race of a tapered roller bearing 72 is mounted on a shoulder 73 formed on the turret column 66 adjacent its lower end, and the outer race of bearing 72 supports an annular bearing housing ring 74. Ring 74 has an exterior annular flange 76 which supports a tubular drum 78 on its upper side, and has positioned against its lower side a main spur gear 80. Spur gear 80 and drum 78 are secured to each other by a plurality of machine bolts 82 extending through apertures in the flange 76 of the bearing housing ring 74. The upper end of drum 78 is received in an annular recess 84 in the underside of a bottom turret plate 86. This plate 86 is secured to drum 78 by a plurality of machine screws 88, the heads of which are received in countersunk apertures 89 on the upper side of turret plate 86. Bottom turret plate 86 has an inwardly extending central annular flange 90 that supports the outer race of the second tapered roller bearing 92, which has its inner race seated on the periphery of central turret column 66. A top bearing cap 94 is secured to the top of central column 66 by a plurality of machine bolts 96, with the underside 98 of cap 94 bearing against the inner race of the upper tapered roller bearing 92. A slight clearance is provided between the underside of cap 94 and the top of the central turret column 66 so that the cap may rotate with respect to the column 66. It would be apparent, that in the above-described construction, drum 78 and bottom turret plate 86 are mounted for rotation with respect to turret column 66 when the spur gear 80 is rotated.

Spur gear 80 is rotated by a drive pinion 100 non-rotatably mounted at the upper end of shaft 102. Pinion shaft 102 is rotatably supported within the inner races of a pair of ball bearings 104 which are spaced by tubular sleeve 106. The outer races of bearings 104 are received in enlarged bores at the ends of tubular bearing ring member 108 which extends through a circular aperture 110 in the bed plate 62 and is secured to said bed plate by a plurality of machine bolts 112 extending through an annular flange 114 on the outside of ring member 108. A bevel gear 116 is non-rotatably mounted on the lower end of pinion shaft 102, and the entire sub-assembly is secured by a pair of nuts 118 and 120 threaded on the ends of pinion shaft 102. Suitable spacer washers 122 and 124, and lock washer 126, are also provided on pinion shaft 102 as shown in FIGURE 5. A bevel drive input gear 128 drives pinion 100 and thus spur gear 80, drum 78 and bottom turret plate 86 in a manner apparent from FIGURE 5. Drive input gear 128 is driven by any conventional drive belting or gearing system of suitable type, which is suitably mounted on the machine base 60; the machine input drive is not shown in detail because the details thereof are not a part of the present invention.

Referring especially now to FIGURES 4–13, the spout and closure tip assembly turret generally indicated at 56 will be further described in detail.

Figure 7:
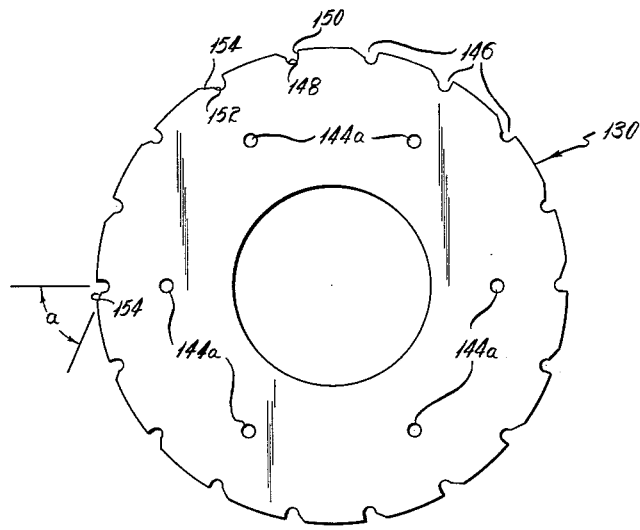
Figure 8:
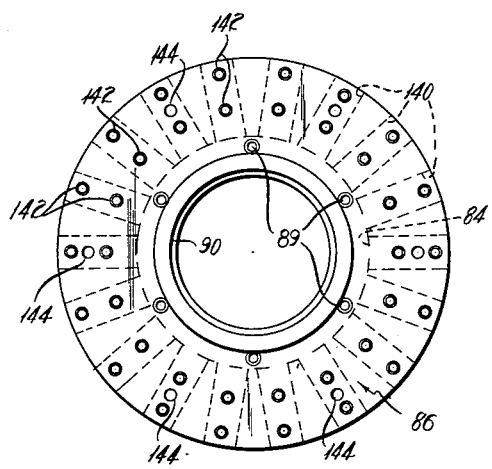
Figure 9:
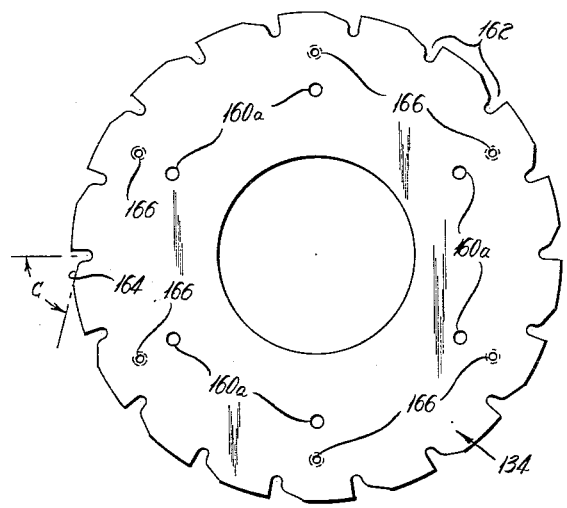
Figure 8:
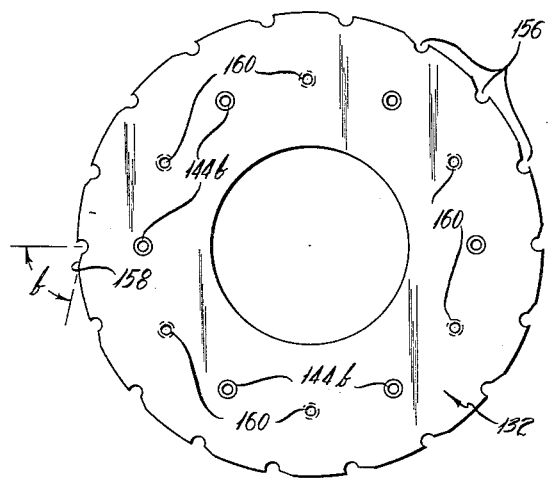

Rotating turret 56 comprises a plurality of superimposed plates supported on the bottom turret plate 86, including, from bottom to top in FIGURE 5: a relatively thin closure tip carrier plate 130 shown in detail in FIGURE 7; a relatively thick turret spacer plate 132, shown in detail in FIGURE 8; a relatively thin spout carrier plate 134, shown in detail in FIGURE 9; a relatively thick spout housing plate 136, shown in detail in FIGURES 10 and 11; and a top cover plate 138, shown in detail in FIGURE 12.

Referring to FIGURES 5 and 6, the circular bottom turret plate 86 is provided on the underside thereof with a plurality of radially extending grooves 140 (18 in number in FIGURE 6). Plate 86 is also provided with a pair of threaded holes 142 along the longitudinal axis of each of grooves 140, and a plurality of threaded holes 144 whereby other plates comprising the turret 56 are secured thereto. Bottom turret plate 86 is further provided with previously mentioned bolt apertures 89, central flange 90, and annular recess 84 on the underside thereof.

Referring to FIGURES 5 and 7, tip carrier plate 130 is provided along its periphery with equally spaced substantially U-shaped recesses 146 (18 in number in the illustrated embodiment). Each U-shaped recess 146 comprises a semi-circular arc 148 terminating in straight sides 150 and 152, which are perpendicular to the diameter of arc 148 and are parallel to each other. The diameter of arc 148 is slightly larger than the inside diameter, and smaller than the outside diameter, of flange 44 on closure tip 34 (see FIGURE 1). As a result, closure tip 34 may be seated and retained in the peripheral recesses 146 of the tip carrier plate 130 for assembly operations. In the turret assembly 56, tip carrier plate 130 rotates counter-clockwise so that sides 150 and 152 are the rearward and forward sides, respectively, for the recesses 146. The forward side 152 of each recess 146 is cut short by a slanted entrant portion 154 which guides the closure tips 34 from the closure tip feeder means 54 into semi-circular recess portion 148. In a preferred embodiment, the angle $a$ between the entrant portion 154 and the radius through the center of each recess 146 is approximately 80°. The tip carrier plate 130 is also provided with a plurality of drilled holes 144a, which, in the assembled turret 56, overlie the threaded apertures 144 in the bottom turret plate 56.

Referring to FIGURES 5 and 8, the relatively thick turret spacer plate 132 is provided along its periphery with a plurality (18 in number) of equally spaced, substantially U-shaped recesses 156 which are similar in configuration to the above-described recesses 146 in the tip carrier plate 130 of FIGURE 7. The forward side of each of the recesses 156 is cut short by a slanted entrant portion 158, which in the preferred embodiment is at an angle $b$ of approximately 80° with the radius through the center of each recess 156. In the assembly turret 56, the recesses 156 of the turret spacer plate 132 accommodate the elongated tip 36 of the dispensing spout 32, and the slanted entrant portions 158 facilitate feeding of the spouts from the spout feeder means 52 to turret 56, as will hereinafter be apparent. The turret spacer plate 132 is provided with a plurality of drilled and countersunk holes 144b, which, in the assembled turret 56, overlie the drilled apertures 144a and threaded apertures 144 in tip carrier plate 130 and bottom turret plate 86, respectively. It is also provided with a plurality of drilled and tapped holes 160.

Referring to FIGURES 5 and 9, the spout carrier plate 134 is provided along its periphery with a plurality of equally spaced recesses 162 (18 in number) which are similar in configuration to the above-described recesses 146 and 156 in tip carrier plate 130 and turret spacer plate 156, respectively. The forward side of each recess 162 is provided with a slanted entrant portion 164, which, in a preferred embodiment, is at an angle c of approximately 80° with the radius through the center of recess 162. The spout carrier plate 134 is provided with a plurality of drilled holes 160a, which, in the assembled turret 56, overlie the threaded apertures 160 in the turret spacer plate 132. This plate 134 has also a plurality of spaced tapped apertures 166.

Referring to FIGURES 5, 10 and 11, the spout housing plate 136 is provided along its periphery with a plurality of equally spaced recesses 168 which are similar in configuration to the above-described recesses 146, 156 and 162 in tip carrier plate 130, turret spacer plate 132 and spout carrier plate 134, respectively. The diameter of the semi-circular portion 169 of recesses 168 is slightly larger than the outside diameter of skirt portion 38 of the dispensing spout 32, and the thickness of plate 136 is slightly greater than the height of skirt portion 38 so that the recesses 168 accommodate this part of the spout 32. The forward side of each of the recesses 168 is cut short by a slanted entrant portion 170, which in the preferred embodiment is at an angle d of approximately 83° with the radius through the center of the recess 168. Spout housing plate 136 is also provided with an annular groove 172 which extends inwardly from the outer periphery of plate 136 beyond the innermost point of recesses 168. In the assembly turret 56, this annular groove 172 receives a spout remover bar which displaces the spouts from the carrier assembly 56 to the discharge means 58 as hereinafter more fully described. Spout housing plate 136 may also be provided, if desired, with radially extending bores 174 connecting each of the recesses 168 with the interior of the ring-shaped plate 136. Compressed air can thus be blown from the inside of the ring 136 through each of recesses 168 to facilitate ejection of spouts 32 from the turret assembly 56. The spout housing plate 136 is also provided with a plurality of spaced drilled holes 166a, which, in the assembled turret 56, overlie the tapped apertures 166 in spout carrier plate 134.

Referring to FIGURES 3, 5 and 12, the top turret cover 138 is an annular ring, and has the same inside diameter, and slightly smaller or same size outside diameter, as the spout housing plate 136. The cover plate 138 is provided with a plurality of drilled holes 166b, which, in the turret assembly 56, overlie drilled holes 166a and tapped holes 166 in spout housing plate 136 and spout carrier plate 134, respectively.

To make a complete unitary turret assembly 56, the turret spacer plate 132 and the tip carrier plate 130 are secured to the base turret plate 86 by socket bolts (not shown) extending through countersunk holes 144b and coincident holes 144a and 144 in said respective plates; spout carrier plate 134 is secured to the turret spacer plate 132 by bolts 176 extending through coincident holes 160a and 160; and top turret cover plate 138 and the spout housing plate 136 are secured to the spout carrier plate 134 by bolts 178 extending through coincident holes 166b, 166a and 166 in said respective plates.

In the thus-assembled turret 56, the recesses 168, 162, 156 and 146 of plates 136, 134, 132 and 130, respectively, are superimposed and aligned as is apparent in FIGURE 5, thereby forming a plurality of aligned spout and tip receiving recesses on the periphery of turret 56; the enlarged skirt portion 38 of spout 32 is received in recess 168, with the surface 39 of the spout lying on the spout carrier plate 134, and the elongated spout tip 36 extending through recesses 162 and 156.

Referring particularly to FIGURES 1 and 4–6, a generally L-shaped anvil housing 180 comprising a horizontal mounting bar 182 and vertical boss 184 is mounted in each of radial grooves 140 on the underside of bottom turret plate 86, by a pair of bolts 186 threaded in tapped holes 142. Each boss 184 is of circular outline, is provided with an axially extending bore 188, and has at the lower end thereof a pair of diametrically opposed slots 190. A cylindrical anvil 192 is reciprocally mounted in bore 188 in each of anvil housings 180, in alignment with, and below, one of the above-described aligned spout and tip receiving recesses in the periphery of turret 56. A small pin 194 extends through a transversely drilled hole in anvil 192 with its ends in elongated diametrically opposed slots 190, so that the anvil 192 is not rotatable in the anvil housing bore 188. The upper end 196 of reciprocable anvil 192 is reduced in size to a diameter less than that of the circular section 148 in recesses 146 on the periphery of tip carrier plate 130, so that reduced anvil end 196 can pass into the recess 146 above it. The lower end of each anvil 192 is milled at 198 and drilled and tapped at 200, and a cam follower roller 202 is rotatably mounted on anvil 192 by means of a machine bolt 204 threaded in tapped hole 200.

As assembly turret 56 rotates about the turret column 66, the cam follower rollers 202 ride on a cam support plate 204 (shown in detail in FIGURE 13) and upon an arcuate cam 206 on the periphery of said plate 204. Cam support plate 204 is mounted at the desired height on the machine bed plate 62 by a plurality of cylindrical support blocks 208 and bolts 210 extending through drilled holes 212 in plate 204 and corresponding holes in blocks 208 and machine bed plate 62. Cam support plate 204 is provided with an enlarged aperture 214 through which bolt 118 and upper end of pinion shaft 102 extend. Cam 206 is made of a strip of metal bent into a quarter-circle, and is peripherally mounted on top of plate 204 between the closure tip feeding means generally indicated at 54 and the assembled spout and tip removal means generally indicated at 58. The cam 206 is secured to plate 204 by a plurality of bolts (not shown) extending from the underside of plate 204 through peripherally spaced holes 216 in that plate into tapped holes (not shown) in the underside of cam 206. The cam 206 comprises five sections: an initial rise section 218; a first level idle section 220; a second further rise section 222; a second level idle section 224; and a fall section 226.

On the machine bed plate 62, a plurality of vertical supporting posts 228 are mounted in any suitable manner at spaced intervals around the assembly turret 56 (one post 228 being broken away for clarity in FIGURE 4). A pair of retaining bands 230 and 232 are mounted on the upper ends of posts 228 by means of tubular collars 234 and 236, which are welded to the outside of bands 230 and 232, respectively. Wing bolts 237 are provided on collars 234 and 236 for securing the bands 230 and 232 to the post 228, and thus permit adjustment in the height thereof relative to the machine bed plate 62. The upper band 230 extends around a little more than 180° of the periphery of the spout housing plate 134 and closely adjacent thereto, from the left side of the spout feeder chute 246 to the left side of the spout take-off means 58 as shown in FIGURE 3. Upper band 230 retains the pouring spouts 32 in the assembly turret 56 as they move from the spout feeder chute 246 through the assembly operation to the spout take-off means 58. The lower band 232 extends around approximately 90° of the periphery of the tip carrier plate 130 and closely adjacent thereto, between the closure tip feeder means 50 and the spout take-off means 58. Hence, lower band 232 retains the closure tips on tip carrier plate 130 as they are moved from the closure tip feeder 50 through the assembly operation to the assembled spout take-off means 58. (Lower band 232 is broken away in FIGURE 4, so that the mode of operation in the tip and spout assembly stage is more clearly shown.)

Referring to FIGURES 2 and 3, each of the spout and closure tip feeder means 52 and 54 comprises an orienting vibrator type feeder including bowls 234 and 236, respectively, on enclosed vibrator mechanisms 238 and 240, respectively, which are mounted on stands 242 and 244, respectively. The vibrator feeders 52 and 54 are not shown in detail, because the details of the spout and tip bowl feeder and orienting means do not constitute a part of this invention. Suitable feeders can be purchased from the Syntron Company of Homer City, Pennsylvania. A suitable feeder 52 for spouts 32 is Syntron electric parts feeder Model EB–2–B with a 24-inch bowl having a suitable orienting and discharge track that feeds the spouts 32 to a feeder chute 246 with the spout surface 39 supported on the rails forming the discharge track with their pouring tips 36 hanging downwardly between said rails. A suitable feeder 54 for feeding closure tips 34 is Syntron parts feeder Model EB–01–B with 12-inch bowl having a suitable orienting and discharge track 266 so that it feeds closure tips 34 upside down to a positive spinner feeder mechanism 268.

Referring to FIGURES 16 and 17, spout feeder chute 246 comprises a pair of elongated curved parallel plates 248 and 250 secured to opposite sides of mounting blocks 252 and 254 at each end thereof by bolts and nuts 256. Block 252 is secured to the upper end of an adjustable height supporting post (not shown) which is mounted on stand 242, and block 254 is secured to an adjustable height supporting post (not shown) which is mounted on stand 60. A row of spouts 30 slides down on the upper edge of elongated bars 248 and 250 on spout surfaces 39 with the elongated tips 36 hanging between bars 248 and 250. An elongated cover plate 258 is welded to a series of L-shaped brackets 260, which are secured to feeder chute 246 by bolts 262, and overlies the rails 248 and 250 so that plate 258 retains the spouts 30 in proper seating on said rails. The feeder chute 246 terminates closely adjacent the assembly turret 56 with the forward end of cover plate 258 substantially on the same level as top cover plate 138 and the top of spout supporting rails 248 and 250 substantially on the same level as the top of spout carrier plate 134. As each recess 168 in the spout housing plate 136 passes by the lower end of chute 246, a spout 32 moves into the assembly turret 56 with its skirt section 38 received in recess 168 of plate 136, its cap surface 39 resting on the spout carrier plate 134, and its tip 36 extending downwardly within aligned recesses 162 and 156 in plates 134 and 132, respectively.

If desired, a compressed air means including a valve and appropriate conduits can be mounted on the machine stand 60 as schematically illustrated at 264 in FIGURE 3 so that a stream of compressed air is directed at the lower end of spout feeder chute 246 to impel spouts into recesses 168 of the spout housing plate 136.

Referring to FIGURES 3 and 15, closure tips 34 are fed clockwise out of bowl 236, suspended upside down with their flanges 44 riding on the sides of peripheral bowl track 266. Since the tips are small and light, and almost invariably have some flash which makes gravity feed unreliable, it is desirable to positively feed them into the assembly turret 56, and a brush spinner feeder means generally indicated at 268 is provided for this purpose.

Spinner tip feed means 268 comprises an L-shaped tip feeding track 270 which is at the same level as, and is effectively a continuation of, the track 266 in bowl 236, plus a rotating spinner brush 272 which extends into the tip feeding track 270, as will be apparent from FIGURES 3 and 15. Referring especially to FIGURE 15, the spinner brush 272 is non-rotatably secured on a vertical shaft 274 between upper and lower washers 276 and 278 by a nut 280. The shaft 274 is rotatably mounted in the inner races of a pair of ball bearings 282, the outer races of which are lightly press-fitted within enlarged bores of a spinner housing 284 that is secured to the top of machine bed plate 62 by a plurality of bolts 286. The lower end of shaft 274 extends through an aperture 288 in the machine bed plate 62 and the shaft 274 is driven by any suitable means (not shown, since the details thereof are not a part of this invention). The upper end of spinner housing 284 is provided with an enlarged block 290 that supports spaced members 292 and 294 which form the tip feeding track 270. The outside track member 292 is of generally L-shaped configuration, as shown in FIGURE 3, and is secured to block 290 by a plurality of screws 296. The inside track member 294 is of similar L-shaped configuration in top plan view, as shown in FIGURE 3, but is cut away on a circular arc between its ends so that it comprises a raised L-shaped plate section supported at each end by short block-like sections, one of which is shown at 295 in FIGURE 15. Each of these block sections is provided with a bore through which mounting screws 298 are threaded into the mounting block 290. The spinner brush 272 extends through the cut-away section beneath the L-shaped plate section of member 294 and part-way into the tip feeder track 270, so that when rotated (counterclockwise in FIGURE 3) the brush yieldably urges the line of closure tips 34 towards the assembly turret 56. The upper surface of track 270 at the end adjacent the assembly turret 56 is at substantially the same level as the upper surface of tip carrier plate 130. Thus, as each recess 146 of the tip carrier plate 130 passes the end of track 270, a closure tip 34 is impelled into the recess with flange 44 resting on the upper side of plate 130, and the tip 34 is thus carried away to the assembly position.

As will be apparent from the foregoing description, when a particular set of aligned recesses 168—162—156—146 has passed both the spout feeder chute 246 and the closure tip feeder track 270, a spout 30 and tip 34 are located therein upside down in aligned spaced relationship, ready for assembly, and a reduced anvil end 196 is in aligned spaced relationship below the tip 34. Referring particularly to FIGURES 4 and 5, as the assembly turret 56 continues to rotate (counterclockwise in FIGURE 3), the anvil roller 202 rides up first lift section 218 of cam 206 causing anvil end 196 to engage and raise the closure tip 34 part way so that its enlarged open end loosely envelops the reduced end of spout tip 36. The anvil roller 202 moves on to the first idle section 220 of cam 206, thus permitting the closure tip 34 and the spout tip 36 to "jiggle" with respect to each other, to assure better alignment between them. The anvil roller 202 then rides up the second lift section 222 of the cam 206 raising the anvil end 196 further into the recess 146 in tip carrier plate 130, thus forcing the closure tip 34 upward over the yielding softer spout tip 36. The top cover plate 138 serves as a back pressure member and prevents the spout 32 from being displaced from the assembly turret during this step. The anvil 192 thus firmly seats tip 34 on the spout tip 36, and the spout end re-expands into the grooves between threads 46 on the inside of closure tip 34, thereby producing a completed spout and tip assembly as illustrated at 30 in FIGURE 1. The anvil roller 202 rides on the second cam idle section 224 thereby retaining the anvil end 196 in fully raised position a short time to assure that the closure tip 34 is thus firmly seated on the end of spout tip 36. The anvil roller 202 thereafter passes over cam fall section 226 and anvil 192 drops by its own weight to cam support plate 204, thus withdrawing upper anvil end 196 from operative assembly position. (If desired, springs could be provided for positive withdrawal of anvils 192.) The completely assembled spout tip unit 30 moves on to the spout removal means 58 as the assembly turret 56 continues to rotate. As will be apparent from the foregoing description, this assembly process is carried on continuously in each set of aligned spout and tip retaining recesses (18 in number in the illustrated embodiment).

Referring especially to FIGURES 2–4, 18 and 19, the spout remover means 58 is mounted on a supporting member 300 of I-shaped cross section, welded to a mounting plate 302 that is secured to machine block plate 62 by a plurality of bolts 304. At the top of supporting member 300 there are adjustably secured, by bolt and slot connections 306, a pair of spaced U-shaped supports 308 and 310. A pair of elongated curved bars 312 and 313 forming a track 314 are secured at one end to the legs of U-supports 308 and 310 by welding of countersunk screws, and are similarly connected at their outer ends to the legs of a third similar U-shaped member 315 which is secured to one end of a relatively rigid steel strap 316 mounted on bed plate 62 by bolts 318. At intermediate points, rails 312 and 313 are secured by bolts to the legs of similar U-shaped members 320 and 321 to provide additional rigidity. At their ends adjacent assembly turret 56, the upper surface of rails 312 and 313 are substantially on the same level as the upper surface of spout carrier plate 134.

Referring particularly to FIGURES 18 and 19, the end of rail 313 adjacent the assembly turret 56 is shortened and curved as shown. A spout remover bar 323 having a plan configuration as shown in FIGURE 18 is mounted on rail 313 by a plurality of bolts 324 extending through a pair of like spacer collars 326. The curved end of remover bar 323 extends into slot 172 in the periphery of spout housing plate 136 (which is shown in fragmentary cross section in FIGURE 19), and has a curved spout remover tip 328. As the assembled spouts 30 mounted in the recesses on the periphery of assembly turret 56 are moved past remover tip 328 due to rotation of the turret tip 328 pushes against skirt 38 of each spout and thereby displaces the spout and tip assembly 30 from the recess 168 in the spout housing plate 136 into the track section formed by remover bar 323 and bar 312. Then assembled spouts 30 move into track 314, under the force exerted by spouts behind it being similarly removed from the assembly turret 56. A hinged cover plate 330 is preferably provided over the upper end of track 314 to prevent assembled spouts 30 from bunching or climbing up on each other as they emerge from the turret 56 into the removal track 314. The assembled spouts 30 then pass along track 322 by gravity into a container 332 below the end of rails 312 and 313 as shown in FIGURE 2.

The outside diameter of flange 44 on the closure tip 34 is slightly larger than the outside root diameter of spout tip 36 where it joins spout surface 39. Rails 312 and 313 are spaced apart a distance smaller than the outside diameter of closure tip flange 44 so that when the spout is inverted as it passes U-bracket 321, it will fall from the rails 312—313 outside of container 332 if a closure tip 34 is not assembled on the spout. All assembled spouts, however, are retained on the track by the closure tip flange 44 and therefore fall into the container 332. Thus, the spout removal means includes a device for automatically eliminating, without human inspection, those spouts 32 on which closure tips 34 have not been installed, as may occur when a closure tip occasionally fails to feed into each of recesses 146 on tip carrier plate 130. This device also removes defectively molded short spouts on which the closure tips will not seat. If a spout is not fed into one of the spout carrier recesses 168, the closure tip 34 in the corresponding recess 146 of tip carrier plate 130 will be retained therein and go around for another pass in which it is assembled on the spout subsequently received in the spout housing plate 136 as it passes spout chute 246. If desired, however, unassembled tips could be removed from tip carrier plate 130 by an air stream or an appropriately designed remover bar similar to the spout remover bar in FIGURES 18 and 19.

*Operation.*—It is believed that operation of the closure tip and spout assembly machine 50 is clear from the foregoing detailed description thereof. Summarizing the over-all operation spouts 32 and closure tips 34 are dumped at random into bowls 234 and 236 of vibrator feeders 52 and 54, respectively. The vibrator feeders 52 and 54 orient and feed spouts 32 and closure tips 34 into spout chute 246 and closure tip feeder track 270, respectively. As assembly turret 56 rotates, spouts 32 are fed from chute 246 into the peripheral spout carrier recess made up of aligned plate recesses 168—162—156; and closure tips 34 are fed from track 270 into the peripheral tip recesses 146 in plate 130, each of said tips 34 being below, and in axial alignment with, one of said spouts 30. A reciprocating anvil 192 under each set of spout and tip recesses is raised as it passes over cam 206 so that the anvil tip 196 pushes the closure tip 34 upwardly and axially forces it onto the end of spout pouring tip 36. The closure tip is retained on the spout 32 by engagement of its internal thread 46 with the re-expanded spout pouring tip 36. As the assembly turret 36 continues to rotate, the assembled spout units 30 are removed by the remover bar 323 which extends into slot 172 in the spout housing plate 136, and pass down track 322 from which they are discharged into container 332, with untipped spouts falling from the track 314 outside of said container.

The assembly machine 50 can be used in the above-described manner to assemble threaded closure tips on spouts which also have preformed threads on their pouring tips. Furthermore, the closure tip can be of the same material as the threaded spout (for example, both spouts and tips can be made of flexible polyethylene). The threaded closure tips can be pushed axially over the threaded spout as the spout will yield during this assembly operation, and the threads of tip and spout will engage and retain the closure tip on the spout for shipment, packaging and initial sale.

Spouts 32 shown in FIGURE 1 are made with pouring tips 36 of varying length. The assembly turret 56 can be readily converted to assemble closure tips 34 on spouts of different lengths by using one or more optional annular spacer plates 340 shown in FIGURE 14. Spacer plate 340 is of desired thickness and has a plurality of drilled holes 144c which will overlie holes 144a in the tip carrier plate 130 when plate 340 is included in assembly turret 56. The spacer plate 340 is installed either between the turret spacer plate 132 and the spout carrier plate 134 or the tip carrier plate 130. Spacer plate 340 has a smaller outside diameter than said plates 130, 132 and 134 so that the outside periphery of spacer plate 340 is positioned radially inwardly of recesses 146, 156 and 162 in plates 130 and 132, respectively. Thus the spacer plate 340 merely "stretches" the recess for spout tip 36 and does not interfere with, or alter, the tip and spout assembly operation as above described.

Closure tips of different sizes can be assembled by using a different plate like 130 with recesses 146 of appropriate size.

The above-described assembly machine generally indicated at 50 operates very efficiently, rapidly, and economically and can assemble as many as 8,000 spouts per hour. A single unskilled attendant can easily run two or more of these assembly machines without difficulty, so that labor expenses are kept to a minimum. This is especially important in such a high volume, low cost field as is here involved. Because of its underlying principle of assembling the threaded closure tips on the spouts by actual displacement instead of screwing them on, as was heretofore done, the operating mechanism of the assembly turret 56 is relatively simple, cheaper to build, and is trouble-free and therefore requires less maintenance than the prior screw-on tip and spout assembly machine known to applicant and heretofore used on behalf of his assignee.

It will be apparent from the foregoing that the present invention provides a novel improved method and apparatus for completely automatically assembling threaded closure tips on plastic pouring spouts for beaded neck and like fluid containers without resorting to screwing them on; that the apparatus of this invention is relatively uncomplicated and very efficient for the job performed by it, and is therefore more economical to build and to operate; that the present invention provides a machine for automatically assembling closure tips and pouring spouts which can be readily modified to assemble closure tips of different size on different size spouts; that the apparatus of this invention includes means for automatically eliminating unassembled spouts and deffective parts like short spouts; and that the present invention provides a method and apparatus for assembling closure tips on plastic spouts which achieves the objects and advantages stated in the introduction of this application.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of assembling a cup-shaped closure tip having an internal thread on a plastic dispensing spout, comprising: orienting the tips and spouts in a predetermined direction for assembly, with the cup opening of the tips disposed so that each tip can receive part of a spout; feeding the spouts and tips as oriented to an assembly station, and arranging a closure tip in aligned spaced relationship with a dispensing spout; and axially displacing each set of aligned closure tip and dispensing spout towards each other without any substantial relative rotation between them to assemble the closure tip on the spout, said closure tip being retained on said spout by the thread in the tip.

2. A method as defined in claim 1, comprising separating spouts without tips assembled thereon as the spouts are removed from the assembly station.

References Cited in the file of this patent

UNITED STATES PATENTS

| | | | |
|---|---|---|---|
| 1,482,151 | Rosenberg | Jan. 29, | 1924 |
| 1,776,615 | Boothman | Sept. 23, | 1930 |
| 1,814,966 | Rosenberg | July 14, | 1931 |
| 1,974,150 | Creveling | Sept. 18, | 1934 |
| 2,271,746 | Schmalz | Feb. 3, | 1942 |
| 2,324,925 | Hallowell | July 20, | 1943 |
| 2,507,072 | Weber | May 9, | 1950 |
| 2,635,328 | Larmour | Apr. 21, | 1953 |
| 2,636,254 | Gunning | Apr. 28, | 1953 |
| 2,666,255 | McCoy | Jan. 19, | 1954 |
| 2,670,885 | Allen | Mar. 2, | 1954 |
| 2,681,668 | Lubbert | June 22, | 1954 |
| 2,728,981 | Hooper | Jan. 3, | 1956 |